United States Patent [19]

Kronenberg et al.

[11] 4,281,250
[45] Jul. 28, 1981

[54] RADIATION DOSE RATE METER

[75] Inventors: Stanley Kronenberg, Skillman, N.J.; Carl R. Siebentritt, Mc Lean, Va.; Harry Van Gorden, Brick, N.J.

[73] Assignee: The United States of America as represented by the Secretary of the Army, Washington, D.C.

[21] Appl. No.: 109,598

[22] Filed: Jan. 4, 1980

[51] Int. Cl.³ .................. H01J 39/29; H01J 39/30
[52] U.S. Cl. .................................. 250/377; 250/374; 250/378
[58] Field of Search ............... 250/377, 378, 376, 388, 250/387, 374, 336

[56] References Cited

U.S. PATENT DOCUMENTS

| | | | |
|---|---|---|---|
| 2,668,245 | 2/1954 | Rich | 250/377 |
| 2,871,365 | 1/1959 | Cahen et al. | 250/377 |
| 2,884,533 | 4/1959 | Richard-Foy | 250/377 |
| 2,898,472 | 8/1959 | Hollmann | 250/377 |

Primary Examiner—Alfred E. Smith
Assistant Examiner—Carolyn E. Fields
Attorney, Agent, or Firm—Nathan Edelberg; Sheldon Kanars; Jeremiah G. Murray

[57] ABSTRACT

A combined dose rate meter and charger unit therefor which does not require the use of batteries but on the other hand produces a charging potential by means of a piezoelectric cylinder which is struck by a manually triggered hammer mechanism. A tubular type electrometer is mounted in a portable housing which additionally includes a Geiger-Muller (GM) counter tube and electronic circuitry coupled to the electrometer for providing multi-mode operation. In one mode of operation, an RC circuit of predetermined time constant is connected to a storage capacitor which serves as a timed power source for the GM tube, providing a measurement in terms of dose rate which is indicated by the electrometer. In another mode, the electrometer indicates individual counts.

10 Claims, 7 Drawing Figures

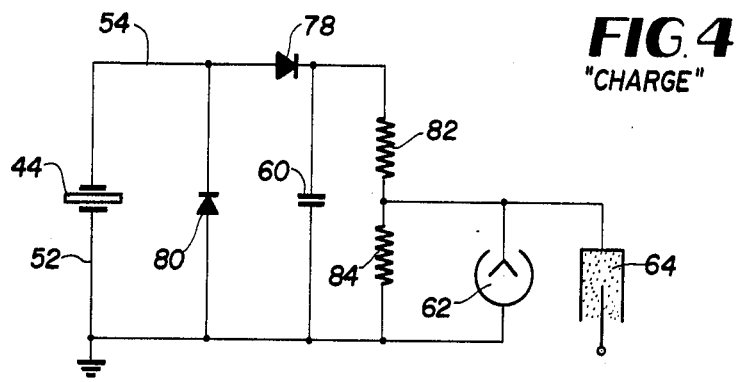
FIG. 4 "CHARGE"
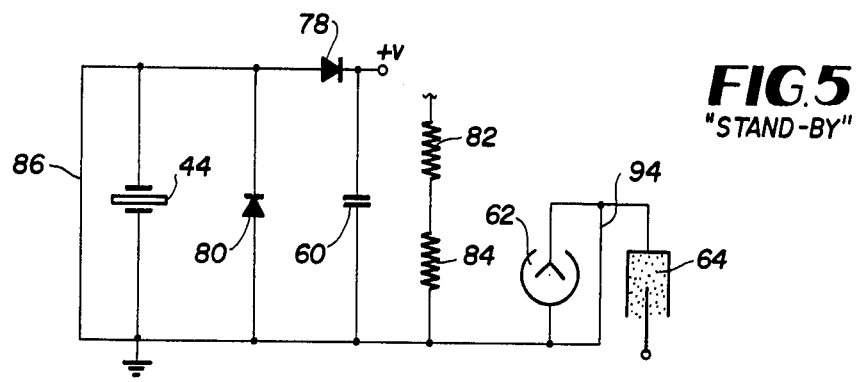
FIG. 5 "STAND-BY"
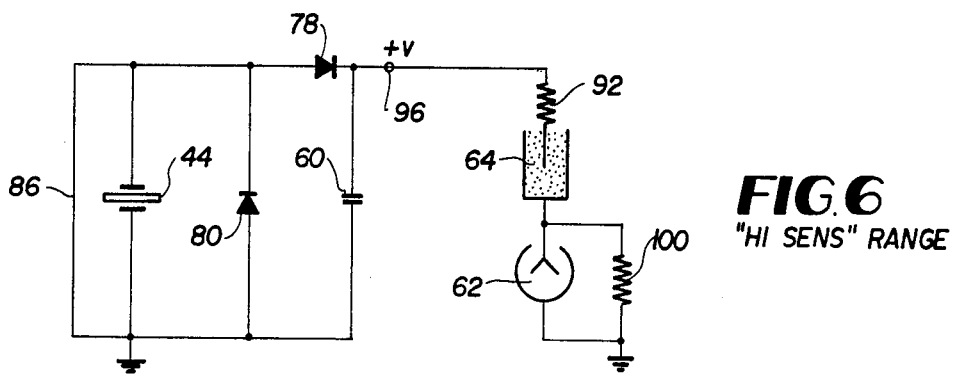
FIG. 6 "HI SENS" RANGE
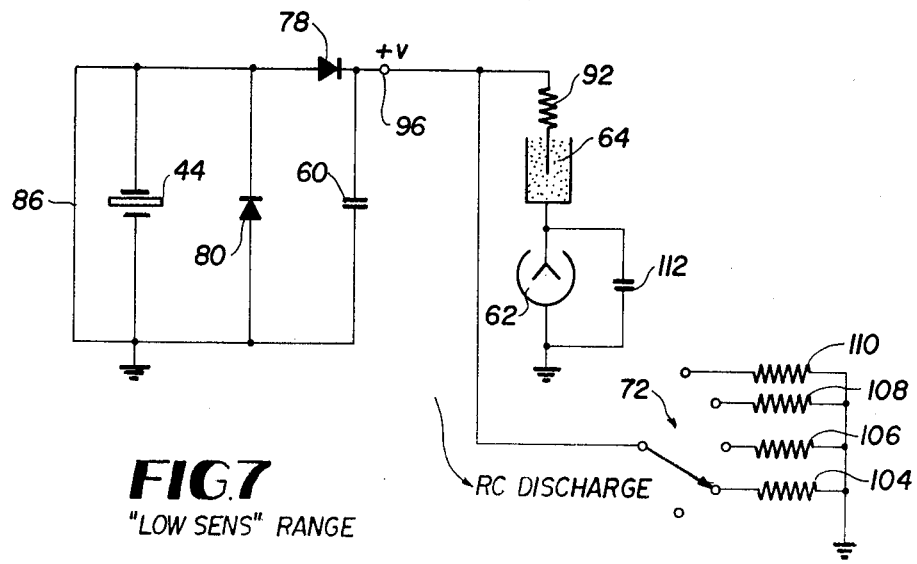
FIG. 7 "LOW SENS" RANGE

4,281,250

RADIATION DOSE RATE METER

The invention described herein may be manufactured and used by or for the Government for governmental purposes without the payment of any royalties thereon or therefor.

BACKGROUND OF THE INVENTION

This invention relates to apparatus for measuring exposure to radiation and more particularly to an instrument for measuring radiation dose rate.

Various types of apparatus are known for measuring radiation such as gamma rays and X-rays, a typical example being a dosimeter utilizing a quartz fiber electrometer. Devices of this type operate on the electrostatic charge principle and require charging prior to their use. Additionally, such devices normally operate to provide an indication of accumulated dose over a predetermined exposure level rather than an instantaneous reading of radiation intensity which is thereby able to indicate a potentially hazardous area of gamma rays and X-rays prior to entering or in the case of a civil defense emergency protect individuals from nuclear fallout by being able to measure local radiation levels so that appropriate defensive action may be taken.

Accordingly, it is an object of the present invention to provide a new and improved instrument for measuring radiation intensity;

It is another object of the present invention to provide an instrument which measures radiation dose rate and which is immediately usable following an indefinitely long storage time.

It is a further object of the present invention to provide a portable radiation intensity meter which is of a construction which requires substantially no maintenance.

SUMMARY

Briefly, the subject invention is directed to a dose rate meter and charger assembly therefor which is of simple and economical construction. The apparatus is portable and adapted to be hand-held during operation. Accordingly, a manually operable charger unit includes a charge producing mechanism consisting of a piezoelectric cylinder which is caused to be struck by the snap action of a triggered hammer element located in a hand grip. The charging unit is integrally attached to a housing having a pocket type quartz fiber electrometer secured thereto which operates as an electrostatic voltmeter. The voltmeter operates in conjunction with electrical circuitry to provide multiple range measurements of radiation dose rate. A Geiger-Muller (GM) counter tube is included in the circuitry and acts as a charge transport device when coupled to the electrometer. A storage capacitor is charged during the charging mode to power the GM tube. A resistance capacitance discharge circuit of a predetermined time constant is thereafter connected to the storage capacitor which serves as a timed power source for the GM tube, thereby providing a radiation measurement in terms of dose rate which is indicated by the electrometer.

Other objects and advantages of this invention will become apparent as the following description proceeds when considered in connection with the accompanying drawings.

BRIEF DESCRIPTION OF THE DRAWINGS

FIGS. 4 through 7 are respectively illustrative of four electrical schematic circuit diagrams provided by the configuration shown in FIG. 3 for implementing four separate operational modes.

DESCRIPTION OF THE PREFERRED EMBODIMENT

Figure 1:
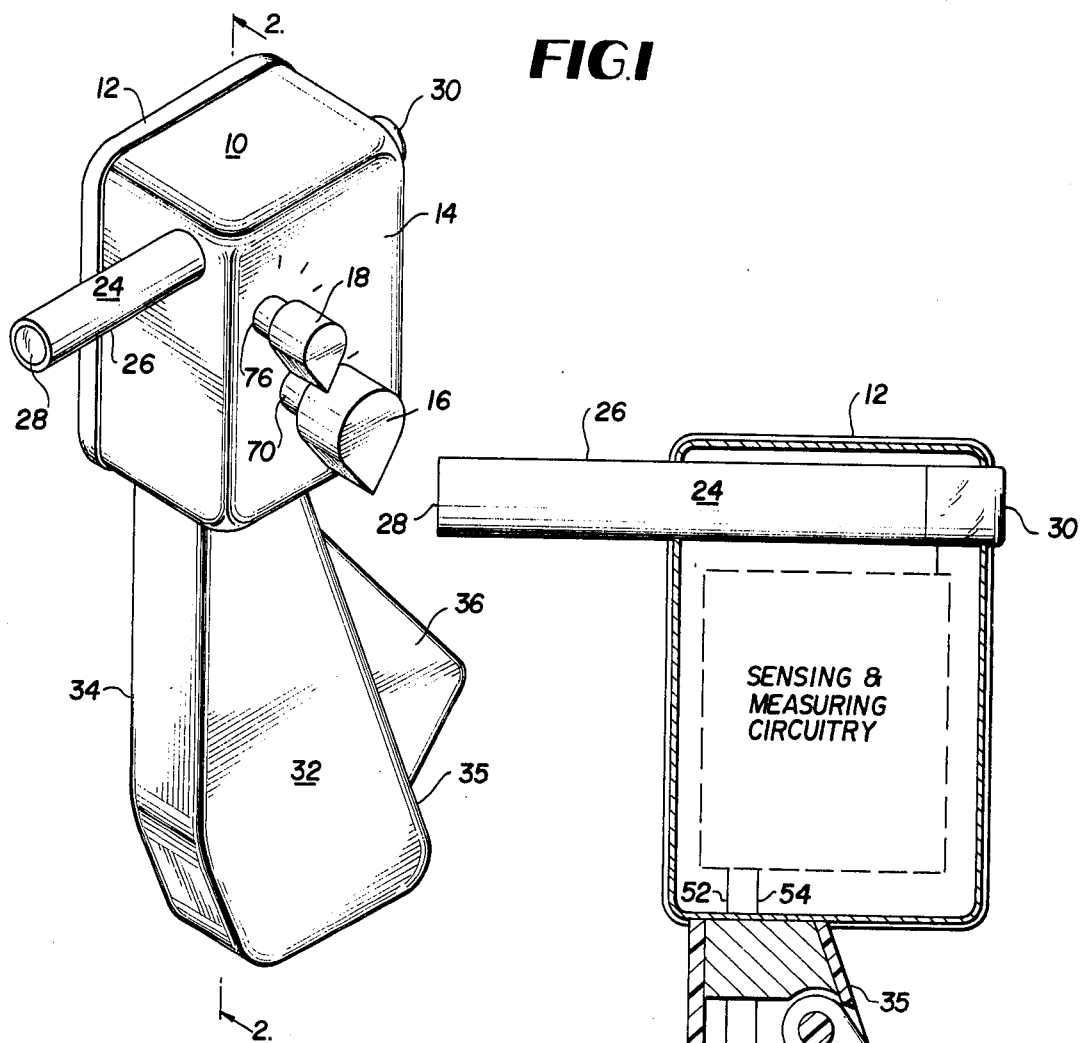
FIG. 1 is a perspective view generally illustrative of the construction of the subject invention.

Referring now to the drawings wherein like reference numerals refer to like components throughout, attention is first directed to FIG. 1. Reference numeral 10 denotes a dirt and water-tight housing which is adapted to contain the electrical circuitry shown schematically in FIGS. 3 through 7. The housing 10 is generally rectangular in configuration, and includes a removable cover 12. On the opposite wall 14 from the cover there is mounted two switches, an operation mode switch, and a range switch, not shown, which are operated by the knobs 16 and 18, respectively. These switches constitute the mode switch assembly 20 and range switch assembly 22 shown in the schematic diagram of FIG. 3. Additionally, the housing 10 accommodates a dosimeter type electrometer 24 of a conventional type which includes an elongated barrel 26, an eyepiece 28, a light aperture member 30 and an internal quartz fiber electrometer assembly and indicator scale, not shown.

Figure 2:
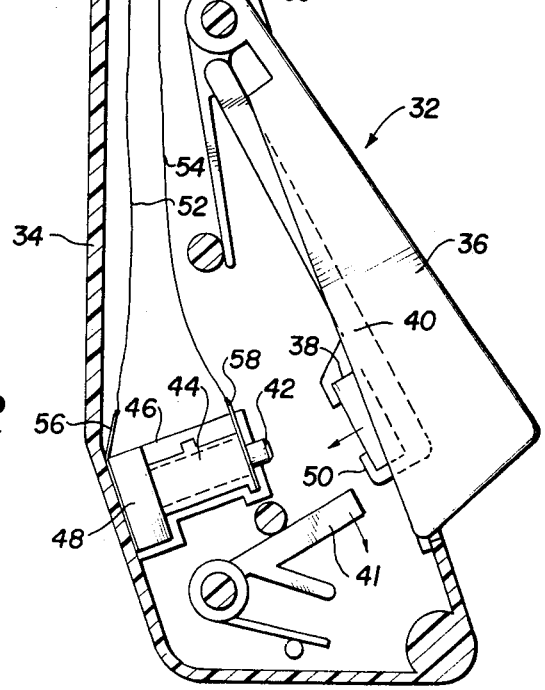
FIG. 2 is a longitudinal cross sectional diagram taken along the lines 2—2 of FIG. 1 and which is illustrative primarily of the charger unit which forms an integral part of the subject invention.

On the underside of the housing 10 is attached a piezoelectric charging unit 32. This charging unit is shown in detail in FIG. 2 and comprises an elongated body 34 which is of a shape to facilitate its being gripped by the hand of the user. Projecting from one narrow (forward) sidewall 35 is a resiliently biased actuator or trigger 36 which is adapted to be moved inwardly and tripped in response to a squeezing action. The actuator 36 additionally includes a striker member in the form of a metallic hammer element 38 contained within a movable arm 40 which is adapted to engage a resiliently biased trip lever 41 and has for its purpose striking of a metal pin 42 located at the top of a piezoelectric element 44 held in a fixed position by means of a bracket type sub-assembly 46. A metal base plate 48 is located at the bottom of the piezoelectric member for acting as a support and an electrode.

In operation, an inward motion of the actuator 36 causes the outer portion 50 of the arm 40 to contact the trip lever 41 which is forced to rotate out of the way of the arm, at which time a sharp impact is delivered to the pin 42 from the hammer element 38. This causes a relatively high voltage to be produced across the end faces of the piezoelectric member 44 which is coupled to a pair of electrical wire leads 52 and 54 connected to the electrical contacts 56 and 58. Thus there is provided a self-contained power source consisting of a cylinder of piezoelectric ceramic comprised of, for example, lead-zirconium-titanate (PZT) which can be left idle indefinitely, but is operable on demand to produce a pulse burst of electrical energy having a maximum amplitude in the order of 15 kV for a period of approximately $1 \times 10^{-6}$ seconds. The body 34 of the charging unit need not be moisture proof because this relatively high voltage signal occurs too fast to be affected by moderate leakage to ground due to moisture.

Figure 3:
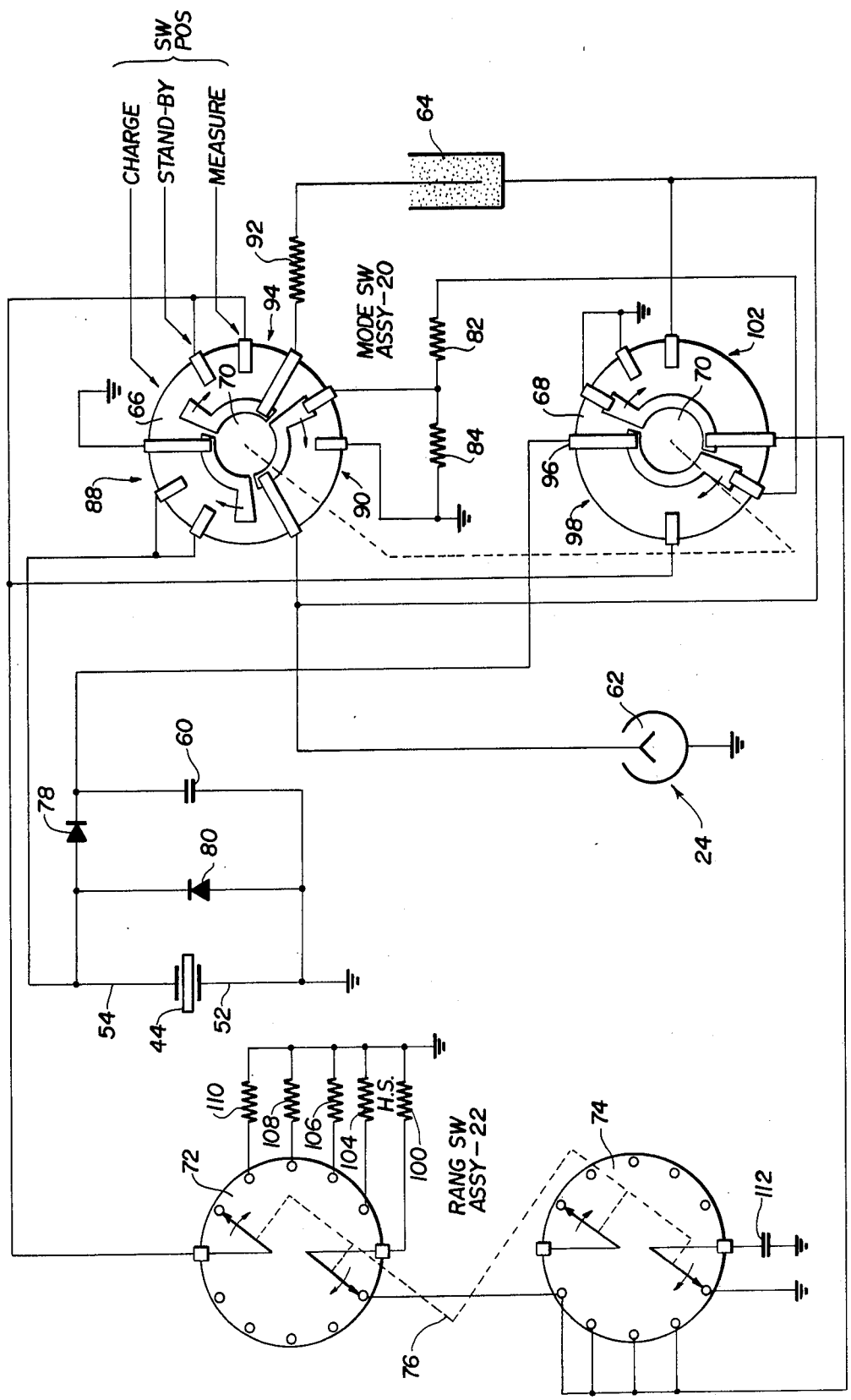
FIG. 3 is a composite electrical schematic diagram for implementing plural circuit configurations which are required for multi-mode operation.

The circuitry required to implement the subject invention is shown schematically in FIG. 3 and involves in addition to the piezoelectric element 44 in the charger unit, a capacitor 60 which is adapted to be charged by the charger unit 32, an electrostatic voltmeter in the form of a quartz fiber assembly 62 in the electrometer assembly 24, and a Geiger-Muller (GM) tube 64 which is utilized as a radiation sensor. The switch assemblies 20 and 22 provide interconnection of the components shown in FIG. 3 to provide four separate circuit configurations shown in FIGS. 4, 5, 6 and 7, to provide a circuit for the "charge" mode, a "stand-by" mode, and "high" and "low" sensitivity range measurement modes, respectively.

The mode switch assembly 20 as shown in FIG. 3 is comprised of two ganged switch decks 66 and 68 which are operable by a common detent member 70 driven by the knob 16 shown in FIG. 1. In a similar manner, the range switch assembly 22 is comprised of two switch decks 72 and 74 which are ganged together and operated by a common detent member schematically shown by reference numeral 76 connected to the knob 18. The switch deck 66 of the mode switch assembly 20 comprises a three-pole, three-position switch configuration, while the switch deck 60 comprises a two-pole, three-position switch configuration. The position of the switch contacts shown in FIG. 3 constitutes the "charge" position. The next clockwise position constitutes the "stand-by" position and the third position constitutes the measure position for both the "high" and "low" sensitivity ranges which are selectable by the switch assembly 22. The two range switch decks 72 and 74 both constitute two-pole, five-position switch assemblies for implementing one "high" sensitivity range and four "low" sensitivity ranges scaled from 1.0 rad per hour to a 1000 rads per hour in factors of 10, i.e. 1, 10, 100 and 1000 rph.

The component interconnection shown in FIG. 3 can best be explained when considered with each of the four schematic diagrams shown in FIGS. 4 through 7. Considering first FIG. 4, the "charge" position of the mode switch assembly 20 is adapted to connect the piezoelectric crystal 44 in the charging unit 32 across the storage capacitor 60 through a pair of rectifier diodes 78 and 80. A resistive voltage divider consisting of the series connected resistors 82 and 84 is coupled in parallel with storage capacitor 60. The quartz fiber assembly 62 is connected across the resistor 84 and acts as an electrostatic voltmeter for measuring the voltage on the storage capacitor 60. The resistance values of the resistors 82 and 84 are selected so that a 1/10 voltage divider ratio is achieved, meaning that the electrometer 62 will sense 1/10 of the voltage appearing across the capacitor 60. In operation, squeezing of the trigger 36 of a charger unit 32 causes a charge pulse in the order of $10^{-6}$ coulomb per stroke to be applied as a DC charging potential to the capacitor 60. In the charging mode of operation, the charger assembly is successively actuated until a predetermined voltage is accumulated on the capacitor 60, at which time the mode switch 20 is switched to the "stand-by" position. In the event that the capacitor 60 is charged to a greater potential than is required, the series combination of resistors 82 and 84 provide a bleedoff circuit until such time as the predetermined voltage level is reached, at which time the circuit is opened by the mode switch.

In the "stand-by" mode, the mode switch assembly 20 shown in FIG. 3 acts to disconnect the capacitor 60 from the voltage divider, i.e. resistors 82 and 84. Due to the unidirectional current flow characteristics of the rectifier diodes 78 and 80, no discharge path is provided for the capacitor 60 and thus it holds the charge potential substantially to the level applied during the charging mode. In addition, the stand-by switch position provides a shunt circuit 86 across the piezoelectric element 44 through portion 88 of the switch deck 66. This prevents an inadvertent activation of the charger 32 from applying any further charge to the storage capacitor 60. Also, the switch section 90 of the switch deck 66 acts to ground the input to the fiber electrometer assembly 62 until such time that a radiation measurement is to be made or a recharging of storage capacitor 60 is required.

Proceeding now to the measurement mode and the circuitry therefor, the circuits shown in FIGS. 6 and 7 disclose two separate circuits for connecting the capacitor 60, which has previously been charged, to the GM counter tube 64. The GM tube 64 acts as a charge transport device and avalanches in response to sensed radiation as long as the voltage $+V$ across the capacitor 60 is above a predetermined magnitude. The electrometer fiber assembly 62 is connected in series to the GM tube 64 and operates to measure the transport charge of the tube.

Considering the high sensitivity range circuit of FIG. 6, a fixed "quenching" resistor 92 is adapted by means of switch portion 94 of the switch deck 66 to be connected in series with the GM tube 66 to circuit junction 96 through switch portion 98 of switch deck 68. Additionally, a relatively high value fixed resistor 100 is connected across the electrometer assembly 62 by means of the switch portion 102 of switch deck 68 and the switch decks 72 and 74. In operation, the transport charge coupled to the electrometer 62 from the GM tube 64 is drained by the fixed resistor 100, which in combination with the stray capacitance of the electrometer assembly 62 provides a discharge time constant in the order of one second. Thus individual counts or pulses developed by the GM counter tube 64 are visually detected as sudden jumps in the electrometer readings followed by slow decays. As the voltage stored on the capacitor 60 decreases, the pulse amplitude of the jumps decreases and it may become necessary to recharge the instrument. In such a circuit configuration one pulse per second detected corresponds to approximately one millirad per hour of radiation intensity. This circuit additionally provides a convenient means for making an operational check prior to making measurements in any one of the four low sensitivity ranges afforded by the circuit implementation in FIG. 7.

Referring now to FIG. 7, four separate RC time constants for discharging the capacitor 60 are provided by the resistors 104, 106, 108 and 110 connected to switch deck 72, and which are selectively coupled thereby to circuit junction 96. Four separate and distinct timing intervals are thus provided for sampling the total accumulated charge during that interval which then provides an indication of charge accumulated per unit time or dose rate.

It is desirable during this mode of operation to exhibit an increased electrometer capacitance. This is provided by means of capacitor 112 which is switched into the circuit by means of switch deck 74 shown in FIG. 3. The operational interval or measurement interval is thus determined by the time it takes capacitor 60 to discharge sufficiently to the point where the GM tube no longer functions to the level where electrometer assembly 62 is able to sense transport charge developed thereby. An indication is thus provided of dose rate directly on the scale of the indicator which is preferably calibrated, not shown, contained in the tubular assembly 26, as viewed by looking into the eyepiece 28 of FIG. 1.

Thus what has been shown and described is an instrument particularly designed for civil defense/emergency use which does not require batteries but can be stored indefinitely without maintenance, but is ready for use on demand. In the circuit configurations shown, the high sensitivity range is capable of reading individual gamma rays with an average of one pulse per second on the high sensitivity range corresponding to an ambient dose rate of one millirad per hour. The other ranges on the other hand sample the dose rate at the instant the mode switch is turned to a particular measurement position with a reading being held indefinitely of the dose rate sensed.

Having thus shown and described what is at present considered to be the preferred embodiment of the subject invention, it is to be understood that modifications and alterations may be resorted to without departing from the spirit and scope of the subject invention as defined by the adjoining claims.

We claim as our invention:

1. A radiation detecting instrument powered by charging means and being adapted to measure dose rate over a wide range, comprising, in combination: an electrostatic metering device including visual indicator means; a storage capacitor;
   circuit means in a first mode of operation coupling said storage capacitor to said metering device for measuring the voltage appearing across said storage capacitor during operation of said charging means;
   circuit means in a second mode of operation decoupling said storage capacitor from said metering device following said first mode of operation;
   circuit means including a radiation sensitive charge transport device, in a third mode of operation, coupling said charge transport device between said storage capacitor and said electrostatic metering device, and additionally including means shunting said metering device to rapidly discharge the stray capacitance associated therewith to provide indications of individual rays of radiation being sensed; and
   circuit means including a radiation sensitive charge transport device, in a fourth mode of operation, coupling said charge transport device between said storage capacitor and said electrostatic metering device and additionally including means coupled to said storage capacitor for providing a discharge circuit therefor and having a predetermined discharge time constant which is adapted to provide a predetermined operating time interval for said charge transport device whereby said metering device provides an indication of measured dose rate.

2. A radiation detecting instrument powered by a charger for measuring dose rate, comprising, in combination:
   a housing;
   a multi-operational mode radiation detection and metering circuit means contained in said housing;
   an electrostatic metering device including visual indicator means mounted on said housing;
   said detection and metering circuit means including a storage capacitor coupled to said charger and being charged thereby during operation of said charger;
   circuit means in one mode of operation coupling said storage capacitor to said metering device for measuring the voltage across said storage capacitor during operation of said charger; and
   said detection and metering circuit means additionally comprising circuit means including a radiation sensitive charge transport device in a subsequent mode of operation, following said one mode of operation, coupling said charge transport device between said storage capacitor and said electrostatic metering device, and additionally including means shunting said metering device to rapidly discharge the stray capacitance associated therewith to provide an indication of individual rays of radiation being sensed.

3. The instrument as defined by claim 2 and additionally including a quenching resistor coupled between said storage capacitor and said charge transport device.

4. A radiation detecting instrument powered by a charger for measuring dose rate, comprising, in combination:
   a housing;
   a multi-operational mode radiation detection and metering circuit means contained in said housing;
   an electrostatic metering device including visual indicator means mounted on said housing;
   said detection and metering circuit means including a storage capacitor coupled to said charger and being charged thereby during operation of said charger;
   circuit means in one mode of operation coupling said storage capacitor to said metering device for measuring the voltage across said storage capacitor during operation of said charger; and
   said detection and metering circuit means additionally including circuit means including a radiation sensitive charge transport device in a subsequent mode of operation following said one mode, coupling said charge transport device between said storage capacitor and said electrostatic metering device and additionally including means coupled to said storage capacitor for providing a discharge circuit therefor, said discharge circuit having a predetermined discharge time constant which is adapted to provide a predetermined operating time interval for said charge transport device whereby said metering device measures the accumulated radiation dosage over said time interval and provides an indication of measured dose rate.

5. The instrument as defined by claim 4 and additionally including capacitance circuit means shunted across said electrostatic metering device for increasing the input capacitance of said metering device.

6. The instrument as defined by claim 4 wherein said means for providing a discharge circuit for said storage capacitance comprises a plurality of switched electrical resistors selectively connected to said storage capacitor.

7. The instrument as defined by claim 4 and additionally including a quenching resistor coupled between said storage capacitor and said charge transport device.

8. A radiation detecting instrument comprising:
first and second capacitors;
an electromechanical transducer means for providing electrical energy upon the application of mechanical energy to said transducer means;
discharge resistor means;
timing resistor means;
electrical potential meter means;
a radiation sensitive charge transport device;
mode switch means for selectively providing at least first and second modes of operation;
said mode switch means, in said first mode, interconnecting said transducer means, said first capacitor, said discharge resistor means and said meter means for providing a charging path to said first capacitor from said transducer means and a discharging path from said first capacitor through said discharge resistor means and an electrical potential measuring path from said first capacitor to said meter means for selectively adjusting the charge on said first capacitor;
said mode switch means, in said second mode, connecting said first capacitor to said timing resistor means for discharging said first capacitor through said timing resistor means in a predetermined time interval;
said mode switch means, in said second mode, also connecting said charge transport device to said first and second capacitors for providing a charging path from said first capacitor to said second capacitor upon detection of radiation by said charge transport device; and
said mode switch means, in said second mode, also connecting said meter means to said second capacitor for measuring the charge accumulated on said second capacitor in a predetermined time interval established by the discharge of said first capacitor through said timing resistor means.

9. The instrument according to claim 8 including means selectively adjusting said timing resistor means for selectively adjusting the length of said predetermined time interval.

10. The instrument according to claim 8 wherein said mode switch means selectively provides a third mode of operation connecting said charge transport device to said first capacitor and a high-sensitivity resistor for discharging a portion of the charge on said first capacitor through said high-sensitivity resistor upon the detection of radiation by said charge transport device; and
said mode switch means, in said third mode, connecting said meter means to said high-sensitivity resistor for detecting the discharge of said first capacitor through said high-sensitivity resistor.

* * * * *